United States Patent Office 3,135,751
Patented June 2, 1964

3,135,751
METHOD OF PREPARING DIAMINO-CHLORO-s-TRIAZINE AND ALKYL DERIVATIVES THEREOF
Paul Mildner, Zagreb, Yugoslavia, assignor to Radonja, Kemijska industrija, Sisak, Yugoslavia
No Drawing. Filed Mar. 20, 1962, Ser. No. 181,173
Claims priority, application Yugoslavia Mar. 24, 1961
5 Claims. (Cl. 260—249.8)

Symmetrical diamino-chloro-triazines are used in the production of plastics and as chemical intermediates in preparing surface active agents, organic dyes and therapeutic agents. Diamino-chloro-s-triazines are herbicidal.

This invention relates to a new process for producing these known compounds. Cyanuric chloride has been used so far as a starting material in the preparation of these compounds, while the process of this invention starts with dicyandiamide (cyanoguanidine) and its derivatives which are more easily prepared and less expensive.

This process is characterized by the fact that an alcoholic solution of cyanogen chloride ClCN and of dicyandiamide (cyanoguanidine) or its $N^3$-alkyl or alkenyl derivative of the formula $$RNHC(=NH)NHCN$$

wherein R represents an alkyl or alkenyl radical, is refluxed in the presence of a basic catalyst such as potassium methylate for an appreciable time. On cooling, there is obtained a crystalline or oily precipitate which may be separated from the alcoholic solution by filtration and purified by recrystallization. The general formula of this product is

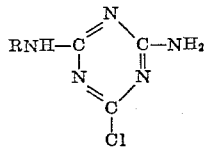

(1)

wherein R is hydrogen if the starting product is dicyandiamide and R represents an alkyl or alkenyl radical respectively, if the starting product is an $N^3$-alkyl-alkenyl derivative of dicyandiamide.

The substitution of the free amino groups in the mono-substituted triazine derivative is carried out according to another feature of this invention by alkylation with an ortho-formate of a corresponding alcohol, which gives an excellent yield (about 80%).

The disubstituted alkyl and alkenyl derivatives of diamino-chloro-s-triazine so obtained have the formula

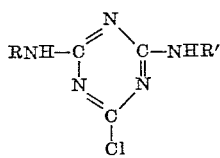

(2)

wherein R' represents an alkyl or alkenyl radical.

EXAMPLE I

2-Ethylamino-4-Amino-6-Chloro-s-Triazine $N^3$-ethylamino cyanoguanidine (1.65 g.) was dissolved in 100 cc. ethyl alcohol. An equivalent quantity of an 0.60% alcoholic solution of cyanogen chloride was added drop by drop. The resulting reaction mixture was heated to a boil in the presence of potassium methylate, and held at this temperature for 2 hours. On cooling needle-like crystals of crude 2-ethylamino-4-amino-6-chloro-s-triazine (1.36 g.) separated. Recrystallization from 1,4-dioxane gave long needles, M.P. 177° C.

EXAMPLE II

2-Ethylamino-4-Isopropylamino-6-Chloro-s-Triazine

To a mixture of 2-ethylamino-4-amino-6-chloro-s-triazine (8.65 g.) and tri-isopropylorthoformate (14.7 g.) a few drops of concentrated sulphuric acid were added, and the mixture was heated on an oil bath to 120° C. The temperature of the bath was continuously increased at such a rate as to evaporate the alcohol formed. The crude alkylated product was distilled in a vacuum and then refluxed for an hour with a 10% aqueous solution of hydrochloric acid. After treatment with potassium hydroxide, crude crystals of 2-ethylamino-4-isopropyl-amino-6-chloro-s-triazine separated. After recrystallization from ethanol a pure product was obtained, M. P. 172° C.

I claim:
1. A method of preparing a triazine derivative of the formula

(1)
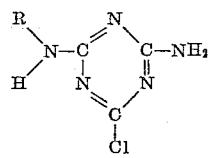

wherein R is selected from the group consisting of hydrogen and lower alkyl which comprises reacting cyanogen chloride with a compound of the formula (2)
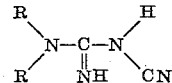

wherein R is selected from said group, in alcoholic solution in the presence of potassium methylate at the boiling temperature of said solution for a period sufficient to form said triazine derivative.

2. A method as set forth in claim 1, which further comprises removing said triazine derivative formed from said alcoholic solution.

3. A method as set forth in claim 1, wherein R is an ethyl radical.

4. A method of preparing a triazine derivative of the formula (3)
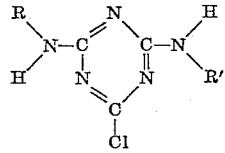

wherein R is selected from the group consisting of hydrogen and a lower alkyl radical, and R' is a lower alkyl radical, which comprises reacting cyanogen chloride with a compound of the formula (2)
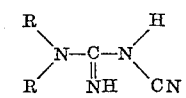

wherein R is selected from said group, in alcoholic solution in the presence of potassium methylate at the boiling temperature of said solution for a period sufficient to form a compound of the formula (1) 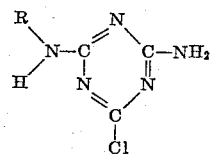

wherein R is selected from said group; separating said last mentioned compound from said alcoholic solution; and alkylating the amino group $NH_2$ of said last mentioned compound with an orthoformate of an alkanol of the formula R'—OH wherein R' is said lower alkyl radical.

5. A method as set forth in claim 4, wherein R is an ethyl radical.

References Cited in the file of this patent

UNITED STATES PATENTS 2,371,100     Kaiser et al. _____ Mar. 6, 1945